US010778875B2

(12) United States Patent
Wan

(10) Patent No.: US 10,778,875 B2
(45) Date of Patent: Sep. 15, 2020

(54) IMAGING CAMERA

(71) Applicant: AAC Technologies Pte. Ltd., Singapore (SG)

(72) Inventor: Jia Wan, Shenzhen (CN)

(73) Assignee: AAC Optics Soutions Pte. Ltd., Singapore (SG)

( * ) Notice: Subject to any disclaimer, the term of this patent is extended or adjusted under 35 U.S.C. 154(b) by 0 days.

(21) Appl. No.: 16/236,326

(22) Filed: Dec. 28, 2018

(65) Prior Publication Data
US 2019/0238731 A1 Aug. 1, 2019

(30) Foreign Application Priority Data
Feb. 1, 2018 (CN) .......................... 2018 2 0192910

(51) Int. Cl.
*H04N 5/225* (2006.01)
(52) U.S. Cl.
CPC ................................ *H04N 5/2254* (2013.01)
(58) Field of Classification Search
CPC .................................................... H04N 5/2254
See application file for complete search history.

(56) References Cited

U.S. PATENT DOCUMENTS

2014/0063307 A1* 3/2014 Wang .................. H04N 5/2254
348/302

* cited by examiner

*Primary Examiner* — Twyler L Haskins
*Assistant Examiner* — Fayez Bhuiyan
(74) *Attorney, Agent, or Firm* — IPro, PLLC; Na Xu

(57) ABSTRACT

The present application discloses an imaging camera, including: a lens holder with an accommodation space; a lens unit group received in the accommodation space; and a supporting frame. The supporting frame includes a top wall having a first surface facing an object side of the imaging camera, a second surface opposite to the first surface, and a third surface connecting the first surface to the second surface. The imaging camera further includes an aperture formed in the third surface; a glue-in opening formed in the first surface; and a glue-out opening formed in the third surface and communicated with the glue-in opening. By virtue of the invention, the pressing ring can be affixed to the lens holder by the glue flowing from the glue-in opening to the glue-out opening via the first and second channels.

8 Claims, 2 Drawing Sheets

IMAGING CAMERA

FIELD OF THE PRESENT DISCLOSURE

The present disclosure relates to the field of image capturing, and more particularly to an imaging camera for capturing an image.

DESCRIPTION OF RELATED ART

With development of technology, besides digital cameras, more and more portable electronic devices are equipped with image capturing functions. To achieve the image capturing function, a camera module is needed.

Generally, a camera module includes a camera lens for collecting light reflected from an object, a sensor for receiving the light and converting the light to electrical signals, and processor for calculating the signals and outputting digital images.

A related imaging camera generally includes a lens holder and a plurality of lens units accommodated in the lens holder. For positioning the lens holder, the imaging camera further provides a housing for accommodating and fastening the lens holder.

Typically, an imaging camera includes a lens holder, at least two lens units accommodated in the lens holder, a pressing ring located between the lens unit adjacent to the lens holder and the lens holder, and a gasket located between the at least two lens units. The lens units are fixed to the lens holder by adhering the pressing ring to the lens holder. The gasket is used for adjusting the distance between the two at least lens units. The pressing ring is mainly used to fasten the components inside the lens holder, and is generally attached to the lens holder by glue. Due to the small volume of the imaging camera, it is not easy to affix the pressing ring to the lens holder by glue. When the pressing ring is affixed by glue, the glue will be overflowed.

Therefore, it is desired that an improved imaging camera can overcome the disadvantages mentioned above.

BRIEF DESCRIPTION OF THE DRAWINGS

Many aspects of the exemplary embodiment can be better understood with reference to the following drawings. The components in the drawing are not necessarily drawn to scale, the emphasis instead being placed upon clearly illustrating the principles of the present disclosure.

DETAILED DESCRIPTION OF THE EXEMPLARY EMBODIMENT

The present disclosure will hereinafter be described in detail with reference to an exemplary embodiment. To make the technical problems to be solved, technical solutions and beneficial effects of the present disclosure more apparent, the present disclosure is described in further detail together with the figure and the embodiment. It should be understood the specific embodiment described hereby are only to explain the disclosure, not intended to limit the disclosure.

Figure 1:
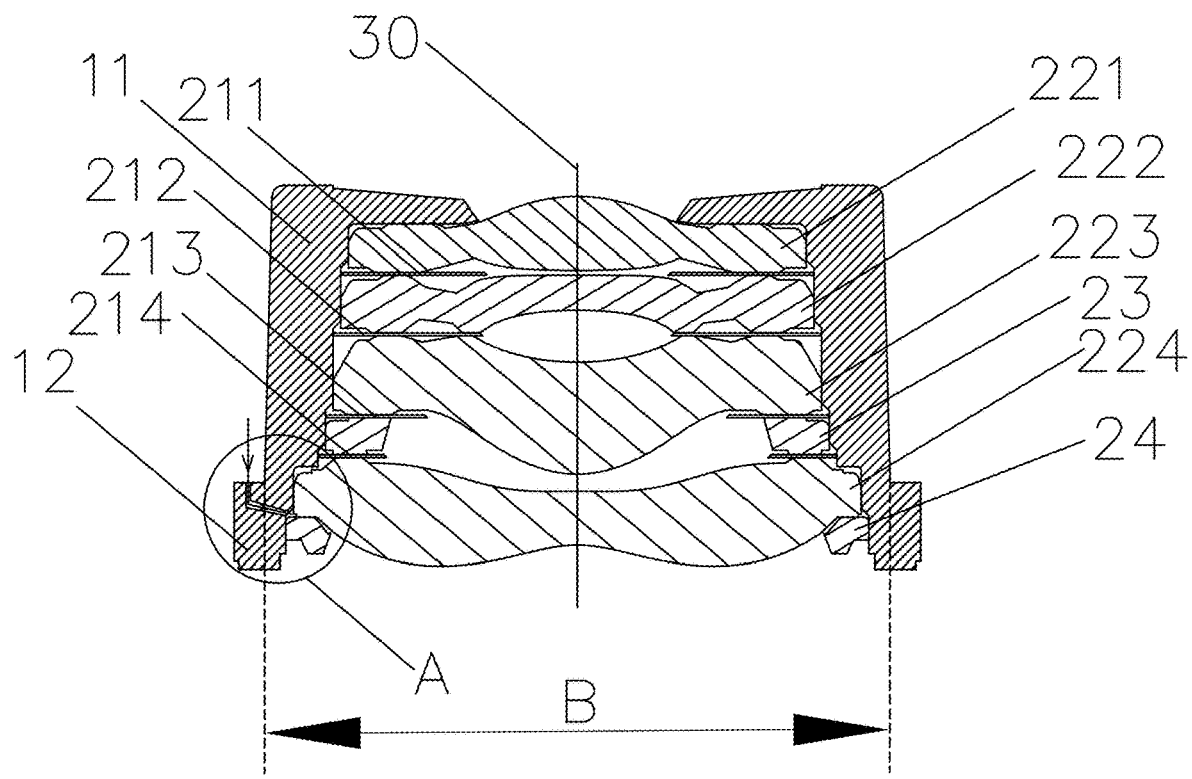
FIG. 1 is a front view of an imaging camera in accordance with an exemplary embodiment of the present invention.
Figure 2:
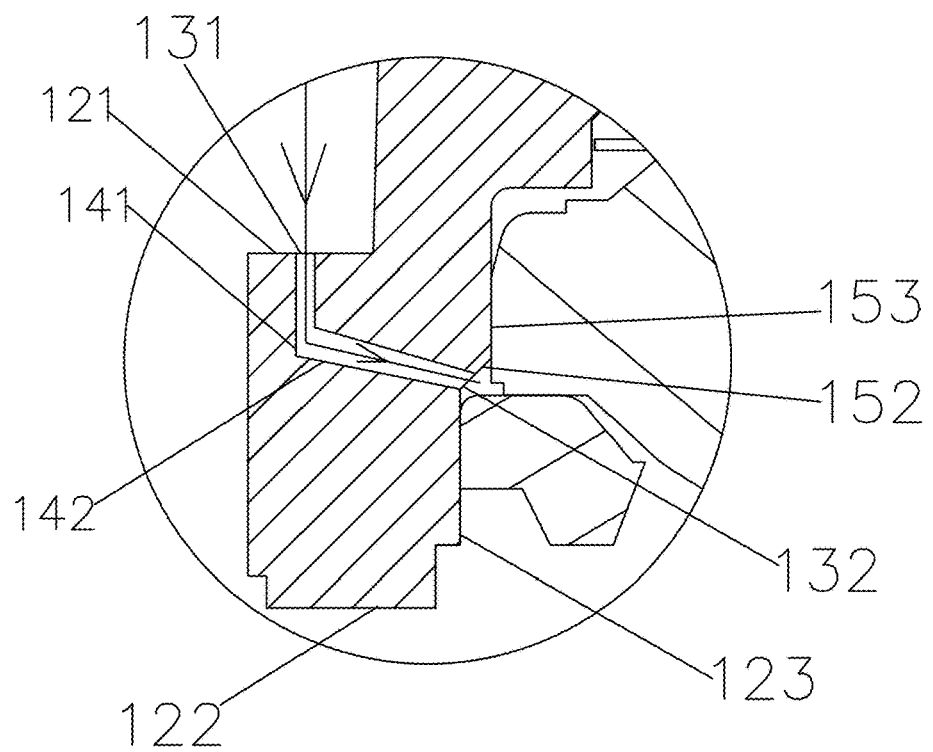
FIG. 2 is an enlarged view of Part A in FIG. 1.

Refer to FIGS. 1-4 for better understanding the present invention. The embodiment is only an example of the invention, not a limitation to the invention. Referring to FIGS. 1-2, an imaging camera in accordance with an exemplary embodiment of the present invention includes a lens holder 11 and a supporting frame 12. The supporting frame 12 locates at an image side end of the lens holder 11 and includes a top wall 122 with an aperture. The top wall 122 of the supporting frame 12 includes a first surface 121 facing an object side of the imaging camera, a second surface 122 opposite to the first surface 121, and a third surface 123 connecting the first surface 121 to the second surface 122 and forming the aperture. The first surface 121 forms a glue-in opening 131, and the third surface 123 forms a glue-out opening 132 communicated with the glue-in opening 131. The glue-in opening 131 formed in the first surface 121 and spaced apart from the aperture. A projection B of the lens holder 11 on the first surface 121 spaced apart from the glue-in opening 131. The lens holder 12 located on the side of the glue-in opening 131 near an optical axis 30.

By virtue of the glue-in opening 131 and the glue-out opening 132, the glue can be injected into the glue-in opening 131 and arrives at the inside of the imaging camera. In FIG. 2, the arrow indicates the direction along which the glue flows. As shown in FIG. 1, the supporting frame 12 is integral with the lens holder 11. In fact, the supporting frame 12 can be also assembled with the lens holder 11.

Referring to FIG. 2, the supporting frame 12 includes a first channel 141 perpendicularly extending downwardly from the glue-in opening 131 and a second channel 142 communicating with the glue-out opening 132. The first channel 141 and the second channel 142 form a flow channel connecting the glue-in opening 131 and the glue-out opening 132. The glue flows from the glue-in opening 131 and arrives at the glue-out opening 132 via the flow channel. The first channel 141 and the second channel 142 are not limited to the configuration as shown in FIG. 2, and according to actual requirements, the first channel 141 can be designed to be other forms or shapes, as long as the flow channel is beneficial to the glue to flow smoothly.

Figure 3:
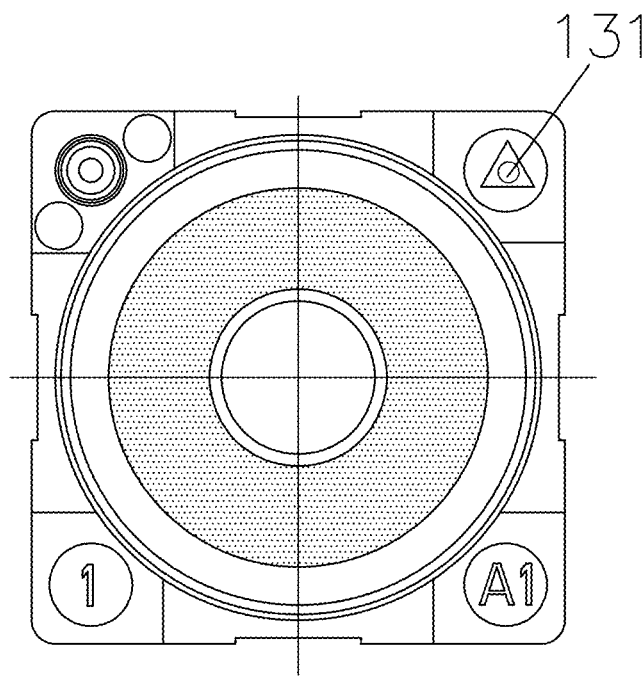
FIG. 3 is a top view of the imaging camera.
Figure 4:
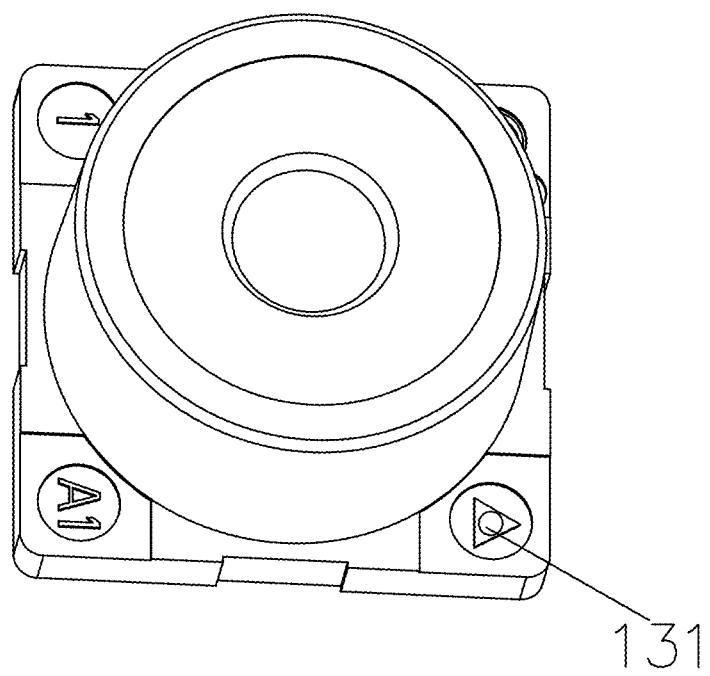
FIG. 4 is an isometric view of the imaging camera.

Referring back to FIG. 1, the supporting frame 12 is used in the imaging camera. Besides the supporting frame 12, the imaging camera further includes a lens holder 11, and a lens unit group accommodated in the lens holder 11. In an order from an object side of the imaging camera to an image side of the imaging camera, the lens unit group includes a first lens unit 221, a shielding 211, a second lens unit 222, a second shielding 121, a third lens unit 223, a third shielding 213, a blocking board 23, a fourth shielding 214, a fourth lens unit 224, and a pressing ring 24 abutting against the lens holder 11. The glue-out opening 132 is formed in the joint of the fourth lens unit 224 and the pressing ring 24, as shown in FIGS. 3-4. It should be noted that the amount of the lens units is not limited to what is disclosed in this embodiment.

The third surface 123 includes a first part, a second part 152 extending obliquely from the first part toward the object side of the imaging camera, and a third part 153 extending perpendicularly from the second part 152 toward the object side. The glue-out opening 132 is formed in the second part 152. The glue-out opening 132 is corresponding to an object side surface of the pressing ring.

By virtue of the invention, the pressing ring can be affixed to the lens holder by the glue flowing from the glue-in opening to the glue-out opening via the first and second channels, and the operation is not restricted by the volume of the imaging camera.

It is to be understood, however, that even though numerous characteristics and advantages of the present exemplary embodiment have been set forth in the foregoing description, together with details of the structures and functions of the embodiment, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. An imaging camera, including:
a lens holder with an accommodation space;
a lens unit group received in the accommodation space;
a supporting frame locating at an image side end of the lens holder including
a top wall comprising a first surface facing an object side of the imaging camera, a second surface opposite to the first surface, and a third surface connecting the first surface to the second surface;
an aperture formed in the third surface;
a glue-in opening formed in the first surface and spaced apart from the aperture;
a projection of the lens holder on the first surface spaced apart from the glue-in opening; the lens holder locating on the side of the glue-in opening near an optical axis;
a glue-out opening formed in the third surface and communicated with the glue-in opening for forming a flowing channel.

2. The imaging camera as described in claim 1, wherein the supporting frame is integral with the lens holder.

3. The imaging camera as described in claim 1, wherein the supporting frame includes a first channel perpendicularly extending downwardly from the glue-in opening and a second channel communicating with the glue-out opening; the first channel and the second channel form a flow channel connecting the glue-in opening and the glue-out opening.

4. The imaging camera as described in claim 3, wherein the third surface includes a first part, a second part extending obliquely from the first part toward the object side of the imaging camera, and a third part extending perpendicularly from the second part toward the object side; the glue-out opening is formed in the second part.

5. The imaging camera as described in claim 4, wherein the lens unit group includes a pressing ring abutting against the lens holder.

6. The imaging camera as described in claim 4, wherein the lens unit group includes, in an order from an object side of the imaging camera to an image side, a first lens unit, a first shielding, a second lens unit, a second shielding, a third lens unit, a third shielding, a blocking board, a fourth shielding, a fourth lens unit, and a pressing ring.

7. The imaging camera as described in claim 5, wherein the glue-out opening is corresponding to the pressing ring.

8. The imaging camera as described in claim 6, wherein the glue-out opening is located adjacent to a joint of the fourth lens unit and the pressing ring.

* * * * *